No. 635,636.  
C. A. BAILEY.  
PIPE COUPLING.  
(Application filed Feb. 1, 1899.)  
(No Model.)  
Patented Oct. 24, 1899.
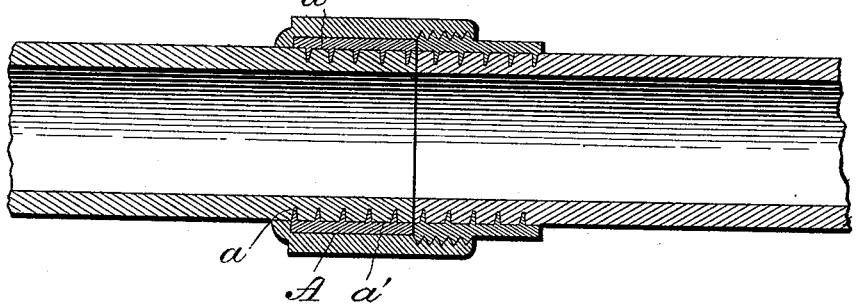
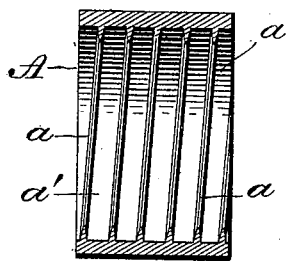
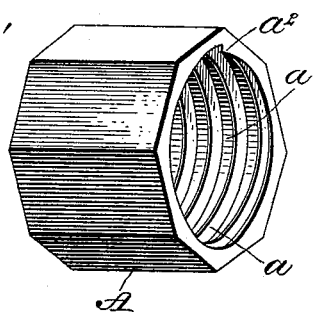
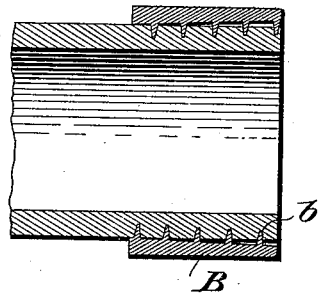
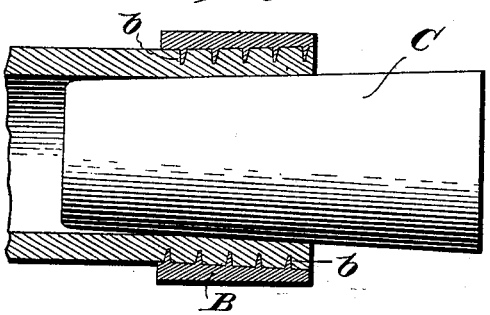
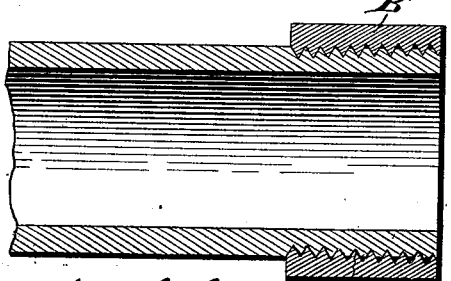
WITNESSES  
Charles A. Bailey,  
INVENTOR,  
by John V. Thomas & Co.,  
Attorneys.

UNITED STATES PATENT OFFICE.

CHARLES A. BAILEY, OF CROMWELL, CONNECTICUT.

PIPE-COUPLING.

SPECIFICATION forming part of Letters Patent No. 635,636, dated October 24, 1899.

Application filed February 1, 1899. Serial No. 704,170. (No model.)

*To all whom it may concern:*

Be it known that I, CHARLES A. BAILEY, a citizen of the United States of America, residing at Cromwell, in the county of Middlesex and State of Connecticut, have invented certain new and useful Improvements in Pipe-Couplings, of which the following is a specification.

This invention is an improvement in pipe-couplings; and it relates more especially to peculiar means for attaching collars to soft-metal pipes in order to provide a cheap, simple, and durable connection and also form a tight and secure joint between the parts.

To this end the invention contemplates the formation of a peculiar thread in the collar which will readily cut or swage its own way upon the soft-metal pipe without twisting the latter or otherwise affecting the same.

The invention embodies the feature of slightly tapering the interior or bore of the collar, and after screwing said collar on the pipe to cause but a slight engagement of the threads the pipe is expanded by means of a tapered plug in order to further swage the threads and insure a tight, secure, and durable joint.

The following specification enters into a detail description of my invention, reference being had to the accompanying drawings and to letters thereon which designate the parts, and what I desire to protect by Letters Patent is more specifically set forth in the appended claims.

In the drawings which form a part hereof, Figure 1 is a sectional view showing the application of my invention. Fig. 2 is an enlarged detail sectional view illustrating one form of thread. Fig. 3 is a perspective view of the collar. Fig. 4 is a sectional view of a modification of the invention, illustrating the disposition of the parts before the pipe is expanded. Fig. 5 is a sectional view with the pipe expanded, embedding the threads thereinto. Fig. 6 is a modification using the ordinary V-thread.

Referring to said drawings, and more particularly to Figs. 1, 2, and 3, the collar (designated by the letter A) is provided interiorly with a comparatively thin thread $a$, running spirally around the inner side of said collar and leaving plane surfaces $a'$ at the base of said thread or rib. The beginning-point of the thread or rib $a$ is preferably cut abruptly, as shown at $a^2$, and being sharp will readily enter the pipe to start the thread thereon. The outer surface of the collar is octagonal or formed with flat surfaces for the engagement of a wrench, which is to be used in turning the collar upon the pipe.

It will be understood that the collar is to be applied to a soft-metal or lead pipe, and the thin female thread or spiral rib will when the collar is turned upon the pipe cut its way thereon or be swaged therein, massing the metal of the pipe between the thread or rib to form a tight, secure, and durable joint. By the particular formation of the thread or rib in the collar no special tool is required for forming a thread upon the pipe, and therefore the operation of coupling a soft-metal pipe can be quickly and conveniently accomplished. This construction of collar forms a simple, cheap, and effective means of securely attaching a collar to a soft-metal pipe, the disposition of the thread or rib permitting the operation to be effected without twisting or otherwise injuring the pipe.

In the modification illustrated in Figs. 4 and 5 of the drawings the interior or bore of the collar B is slightly tapered in order that the thread or rib $b$, which is similar to the thread $a$ in Figs. 1, 2, and 3, will not fit tightly upon the pipe when the collar is turned thereon and before said pipe is expanded into the threads or space between them. In applying this style of collar the end having the larger diameter is first screwed upon the pipe to start a thread thereon. Then the collar is reversed or turned end for end and screwed on, as shown in Fig. 4, after which a tapered plug C is driven into the end of the pipe to slightly expand the latter and form a more secure joint. It will be noted, of course, that but a slight expansion of the pipe is required. In this modification of the invention I may use the ordinary V-thread, as the operation of forming a tight and secure joint is performed by expanding the pipe, while in the form shown in Figs. 1 and 2 it is intended that the straight collar shall fit tightly on the pipe. The practical advantages of such a collar in forming a coupling with a soft-metal pipe will be apparent to those skilled in the art to which my invention relates, the important advantage being that a coupling can be effected with ease and rapidity, and by having the collar swage its own thread a tighter and more secure joint can be had.

Having thus described my invention, what I claim as new, and desire to secure by Letters Patent, is—

1. In a pipe-coupling, the combination with a soft-metal pipe, of a collar provided internally with a comparatively thin spiral rib, adapted to swage a thread on the pipe, substantially as shown and for the purpose set forth.

2. A collar for coupling onto a soft-metal pipe, said collar having internally a spiral rib or thread and a plane surface between said rib or thread, substantially as shown and for the purpose set forth.

3. A collar for coupling to a soft-metal pipe, said collar having internally a spiral rib or thread and a plane surface between the rib or thread, the outer surface of the collar being provided with flat surfaces, substantially as shown and for the purpose set forth.

4. A collar for coupling to a soft-metal pipe, said collar having an internal thin spiral rib or thread with a plane surface between the same, the collar being slightly tapered internally from one end to the other and the outer surface provided with flat surfaces, as herein shown and described and for the purpose set forth.

In testimony whereof I affix my signature in presence of two witnesses.

CHAS. A. BAILEY.

Witnesses:
WILLIAM S. STICKNEY,
CHRISTINE L. STICKNEY.